(12) United States Patent
Roher et al.

(10) Patent No.: US 7,292,544 B2
(45) Date of Patent: Nov. 6, 2007

(54) MULTIPOINT AUDIOVISUAL CONFERENCING SYSTEM

(75) Inventors: Larry E. Roher, Manhasset, NY (US); Jon P. Genna, Lindenhurst, NY (US)

(73) Assignee: Interactive Ideas LLC, Westbury, NY (US)

( * ) Notice: Subject to any disclaimer, the term of this patent is extended or adjusted under 35 U.S.C. 154(b) by 1039 days.

(21) Appl. No.: 10/354,619

(22) Filed: Jan. 30, 2003

(65) Prior Publication Data

US 2003/0142635 A1 Jul. 31, 2003

Related U.S. Application Data

(60) Provisional application No. 60/353,053, filed on Jan. 30, 2002.

(51) Int. Cl.
*H04L 12/16* (2006.01)
*G06F 15/16* (2006.01)
*H04M 11/00* (2006.01)

(52) U.S. Cl. ............ 370/261; 370/265; 348/14.11; 379/93.24

(58) Field of Classification Search ........ 370/260–265; 348/14.09, 14.11; 379/93.21, 93.24, 202.01; 709/205
See application file for complete search history.

(56) References Cited

U.S. PATENT DOCUMENTS

| 5,530,472 | A | * | 6/1996 | Bregman et al. | ........ | 348/14.09 |
| 6,157,401 | A | * | 12/2000 | Wiryaman | ............ | 348/14.09 |
| 6,167,432 | A | | 12/2000 | Jiang | | |
| 6,180,360 | B1 | * | 1/2001 | Kaasgaard et al. | ........... | 435/49 |
| 6,374,302 | B1 | | 4/2002 | Galasso et al. | | |
| 6,490,275 | B1 | | 12/2002 | Sengodan | | |
| 6,519,249 | B1 | | 2/2003 | Bennefeld et al. | | |

FOREIGN PATENT DOCUMENTS

| EP | 0 883 306 A2 | 12/1998 |
| WO | WO 00/22843 | 4/2000 |

OTHER PUBLICATIONS

Rosenberg, et al., IETF Standard-Working-Draft, Internet Engineering Task Force, IETF, CH, No. 1, Mar. 2, 2001 "An Application Server Component Architecture for SIP".
Johnson, T., etal., IETF Standard-Working-Draft, Internet Engineering Task Force, IETF, CH, Mar. 2000 "The ViDe Reference Model for Internet-Extensible H.323 Communications".

* cited by examiner

*Primary Examiner*—Afsar Qureshi
(74) *Attorney, Agent, or Firm*—Scully, Scott, Murphy & Presser, P.C.

(57) ABSTRACT

According to the present invention there are provided a system, method and program storage device for establishing a connection for an endpoint to a scheduled audiovisual conference between a plurality of participants, the plurality of participants connecting to the audiovisual conference from a plurality of endpoints, connections for the plurality of endpoints to the audiovisual conference being maintained by a multipoint control unit, comprising: receiving a request at a conference control server from a participant to connect an endpoint associated with the participant to the scheduled audiovisual conference; obtaining an IP address or a telephone number for the endpoint; writing the IP address or the telephone number for the endpoint to the multipoint control unit; and communicating audiovisual conference data from the multipoint control unit to the endpoint via the IP address or the telephone number, thereby enabling the endpoint to be connected to the audiovisual conference.

15 Claims, 4 Drawing Sheets

United States Patent US 7,292,544 B2

MULTIPOINT AUDIOVISUAL CONFERENCING SYSTEM

This application claims priority from U.S. Provisional Application No. 60/353,053, filed Jan. 30, 2002.

BACKGROUND OF THE INVENTION

1. Technical Field of the Invention

The present invention generally relates to audiovisual conferencing. More particularly, the present invention is directed to a system and method for providing a multipoint audiovisual conferencing, which facilitates a dynamically allocated Internet Protocol (i.e., "IP") address, a dynamically provided Integrated Service Digital Network (i.e., "ISDN") telephone number (or portion thereof) and a Public Switched Telephone Network (i.e., PSTN) telephone number (or portion thereof) for at least one of the endpoints in an audiovisual conference.

2. Description of the Prior Art

Audiovisual conferencing is increasingly becoming a burgeoning field of endeavor, not only in the high-technology business environment, but also in the field of education (e.g., distance learning), and is steadily picking up speed as it makes its way into the living rooms of households. While engaging a person via voice communication, allows one to exchange ideas with, compel, persuade, challenge or teach the person, projecting a visual representation allows one to magnify the effectiveness of that voice communication.

FIG. 1 is a logical prior art audiovisual conferencing system 100 that depicts a Multipoint Control Unit (i.e., "MCU") 124 that bridges a plurality of endpoints arriving at the MCU 124 over disparate networks into a multipoint audiovisual conference, which includes two or more endpoints. The H.323 is a standard approved by the International Telecommunication Union (i.e., "ITU"), which defines how audiovisual conference data (i.e., audio, video, data and combination thereof) are transmitted across the disparate networks, including circuit-switched networks and packet-switched networks (e.g., the Internet). Now particularly with reference to FIG. 1, the endpoints 122 represent H.323 terminals that are part of an IP network (e.g., "LAN") 102 that are routed via router 104 to the MCU 124. Other endpoints may include wireless devices, such a laptop computers 126, wireless telephones 128 and personal digital assistants, (i.e., "PDA") 129, which are interconnected via a wireless network 108 and interfaced via gateway 106 to the MCU 124. Still other endpoints may include devices 130, 132 and 134 that are respectively interconnected by integrated services digital network (i.e., "ISDN") 112, public switched telephone network (i.e., "PSTN") 116 and Enterprise Network 120, which are interfaced to the MCU 124 via respective gateways 110, 114 and 118 and routed to the MCU 124 via routers 104. Endpoints 130 (interconnected via ISDN) and 132 (interconnected via PSTN), utilize the following respective ITU standards H.320 and H.324. As particularly illustrated in FIG. 1, the gateways interface a plurality of disparate networks, such as for example circuit switched networks (e.g., ISDN, PSTN) and packet switched networks, such as the Internet. It is noted that the MCU 124 may include one or more multi-network interfaces for communication with some of the disparate networks. For example, the MCU 124 may include an ISDN interface, in which case the router 104 directly routes the endpoint 130 to the MCU 124, thereby not requiring the gateway 110. Additionally, the MCU 124 may include virtual private network (i.e., "VPN"), asynchronous transfer mode (i.e., "ATM") and like interfaces for linking the MCU 124 with the disparate networks.

A limitation of the audiovisual conferencing system depicted in FIG. 1 is that bridging via a bridge or MCU 124 is required to interconnect two or more audiovisual conference endpoints depicted in FIG. 1. Bridging is limited because it requires that IP addresses of the endpoints outside the IP network 102 and ISDN/PSTN telephone numbers for the foregoing devices 128, 130 and 132 be known in advance of the audiovisual conference, thereby effectively limiting the audiovisual conference to static IP addresses and telephone numbers for those endpoints. Accordingly, at the time that an audiovisual conference is scheduled, an operator inputs the IP address and telephone number via an input means into the MCU 124, thereby reserving resources and establishing other criteria for the audiovisual conference. The resources may include designation of ports in the MCU 124 and bandwidth for the endpoints and the other criteria may include designation of continuous presence, transcoding, and the like. A port is a hardware/software device that accommodates a connection of an endpoint to an audiovisual conference. Once a scheduled audiovisual conference takes place, each endpoint involved in the multipoint audiovisual conference must connect or be contacted via the IP address or telephone number provided during scheduling to join the audiovisual conference. However, the foregoing reservation with static IP addresses and telephone numbers represents a significant drawback, since today IP addresses are usually dynamically allocated each time a user signs onto a network, which may be provided by an Internet Service Provider (i.e., "ISP"), and a telephone number for a user's audiovisual conference device (connecting via ISDN/PSTN) may not be known in advance of the audiovisual conference or may change subsequently to the scheduled audiovisual conference. Consequently, an endpoint may not be able to access the scheduled audiovisual conference.

The prior art audiovisual conferencing system 100 of FIG. 1 may further comprise a gatekeeper (not shown), which may be a part of the MCU 124. The gatekeeper is an optional component, which provides functions that preserve the integrity of the IP network 102 for all registered IP endpoints, gateways and multipoint control units within the IP network 102. The gatekeeper provides address translation from aliases for endpoints 122 on the IP network 102 to IP addresses to route video, audio, data and combination thereof, as defined in the registration, administration and status (i.e., "RAS") specification. The gatekeeper further provides admission control for specifying the endpoints that may establish conferences with other endpoints. Still further, the gatekeeper provides bandwidth management, which is also defined within RAS specification, to manage total bandwidth that is available to the audiovisual conferencing. Finally, the gatekeeper provides zone management for endpoints, gateways and multipoint control units that have registered with the gatekeeper.

A U.S. Pat. No. 6,157,401 to Wiryaman is directed to an endpoint on a common IP network (i.e., Ethernet) initiating a multipoint audiovisual conference by providing aliases for other endpoints to be included in the conference to a gatekeeper located on the Ethernet. It is noted that endpoints that are to be included in the audiovisual conference must beforehand register with the gatekeeper, which manages aliasing for the registered endpoints. It is further noted that the Wiryaman system is a closed system, in which aliases for the endpoints are pre-established and registered with the gatekeeper prior to the conference. Upon connection to the Ethernet, each endpoint's IP address is correlated to the pre-established alias provided to the gatekeeper. However, the Wiryaman system does not address endpoints, which are not registered via the gatekeeper to be able to join in an audiovisual conference. Additionally, if the optional gatekeeper that enables aliasing on an IP network is not provided in the system of FIG. 1, the prior art provides no way for endpoints, whose addresses are dynamically assigned at logon time, to join an audiovisual conference. Consequently, endpoints residing on an Intranet or Internet may not be able to access a scheduled audiovisual conference unless their IP addresses are known in advance of the audiovisual conference.

Therefore there is a need in the art for providing an improved multipoint audiovisual conferencing system and method, which facilitate a dynamically allocated Internet Protocol (i.e., "IP") address, a dynamically provided Integrated Service Digital Network (i.e., "ISDN") telephone number and a Public Switched Telephone Network (i.e., PSTN) telephone number for at least one of the endpoints in an audiovisual conference.

SUMMARY OF THE INVENTION

It is therefore an object of the present invention to provide a fully automatic multipoint audiovisual conferencing system and method, which facilitate dynamically allocated Internet Protocol (i.e., "IP") addresses, a dynamically provided Integrated Service Digital Network (i.e., "ISDN") telephone number (or portion thereof) and a Public Switched Telephone Network (i.e., PSTN) telephone number (or portion thereof) for at least one of the endpoints.

It is another object of the present invention to provide a fully automatic multipoint audiovisual conferencing system and method, which facilitate dynamically allocated Internet Protocol (i.e., "IP") addresses, a dynamically provided Integrated Service Digital Network (i.e., "ISDN") telephone number (or portion thereof) and a Public Switched Telephone Network (i.e., PSTN) telephone number (or portion thereof) for at least one of the endpoints in an audiovisual conference.

According to an embodiment of the present invention, there is provided a method for establishing a connection for an endpoint to a scheduled audiovisual conference between a plurality of participants, the plurality of participants connecting to the audiovisual conference from a plurality of endpoints, connections for the plurality of endpoints to the audiovisual conference being maintained by a multipoint control unit, the method comprising: receiving a request at a conference control server from a participant to connect an endpoint associated with the participant to the scheduled audiovisual conference; obtaining an IP address or a telephone number for the endpoint; writing the IP address or the telephone number for the endpoint to the multipoint control unit; and communicating audiovisual conference data from the multipoint control unit to the endpoint via the IP address or the telephone number, thereby enabling the endpoint to be connected to the audiovisual conference.

According to another embodiment of the present invention, there is provided a system for establishing a connection for an endpoint to a scheduled audiovisual conference between a plurality of participants, the plurality of participants connecting to the audiovisual conference from a plurality of endpoints, connections for the plurality of endpoints to the audiovisual conference being maintained by a multipoint control unit, the system comprising: a conference control server coupled the multipoint control unit for: (a) receiving a request from a participant to connect an endpoint associated with the participant to the scheduled audiovisual conference; (b) obtaining an IP address or a telephone number for the endpoint; and (c) writing the IP address or the telephone number for the endpoint to the multipoint control unit, wherein the multipoint control unit communicates audiovisual conference data from the multipoint control unit to the endpoint via the IP address or the telephone number, thereby enabling the endpoint to be connected to the audiovisual conference.

According to yet another embodiment of the present invention, there is provided a program storage device, tangibly embodying a program of instructions executable by a machine to perform a method for establishing a connection for an endpoint to a scheduled audiovisual conference between a plurality participants, the plurality of participants connecting to the audiovisual conference from a plurality of endpoints, connections for the plurality of endpoints to the audiovisual conference being maintained by a multipoint control unit, the method comprising: receiving a request at a conference control server from a participant to connect an endpoint associated with the participant to the scheduled audiovisual conference; obtaining an IP address or a telephone number for the endpoint; writing the IP address or the telephone number for the endpoint to the multipoint control unit; communicating audiovisual conference data from the multipoint control unit to the endpoint via the IP address or the telephone number, thereby enabling the endpoint to be connected to the audiovisual conference.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

As will be described in greater detail, the present invention is directed to a system and method for providing multipoint audiovisual conferencing, which facilitates a dynamically allocated Internet Protocol (i.e., "IP") address, a dynamically provided Integrated Service Digital Network (i.e., "ISDN") telephone number (or portion thereof) and a Public Switched Telephone Network (i.e., PSTN) telephone number (or portion thereof) for at least one of the endpoints in an audiovisual conference according to the present invention. As used herein, an endpoint may represent an audiovisual conference device connected via an IP network, a wireless device such as a laptop computer, telephone and PDA connected via a wireless network, and an audiovisual conference device connected via ISDN and PSTN.

Figure 1:
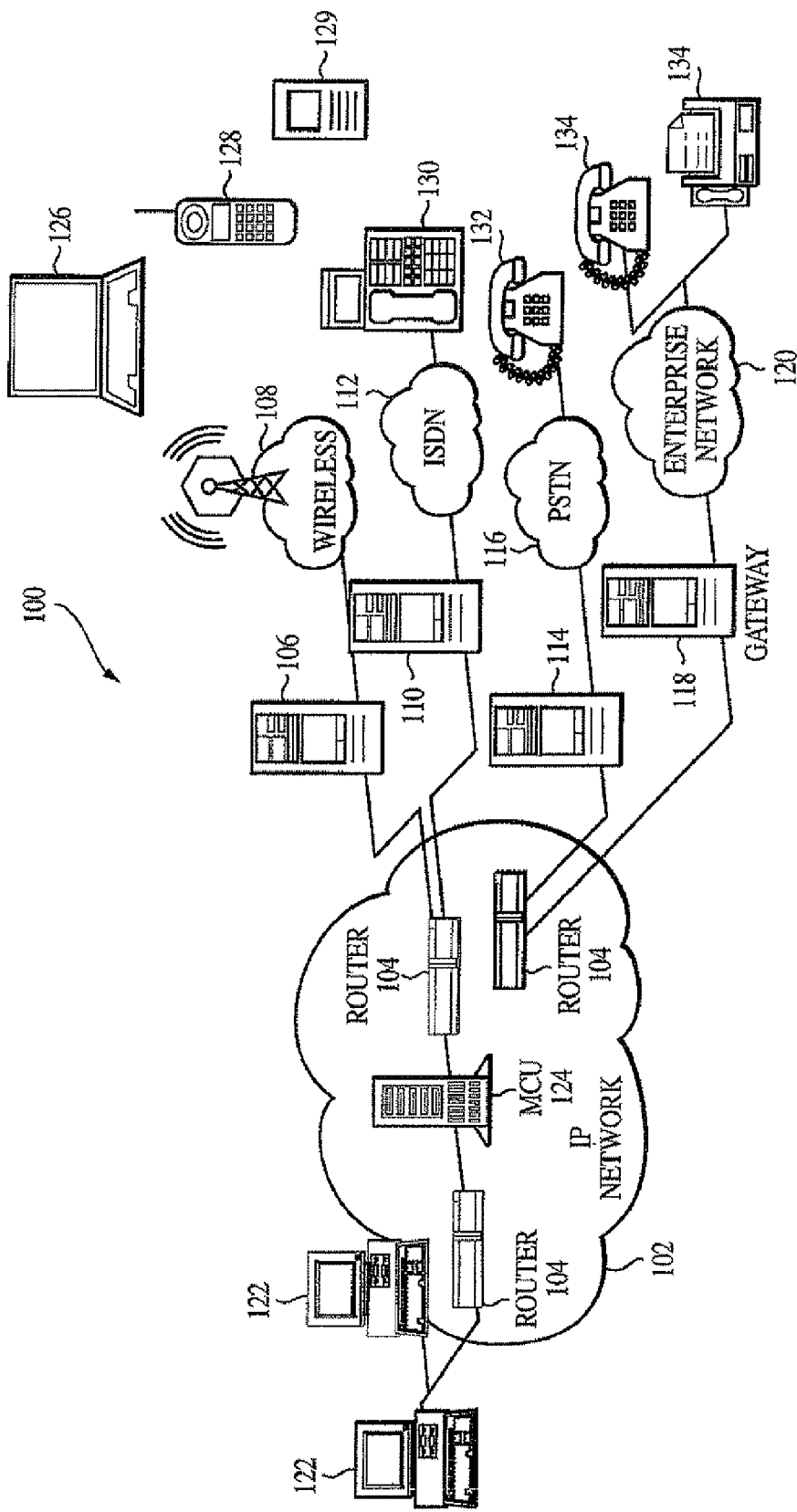
FIG. 1 is a prior art videoconferencing system that bridges a plurality of endpoints at the multipoint control unit from disparate networks into a multipoint audiovisual conference.
Figure 2:
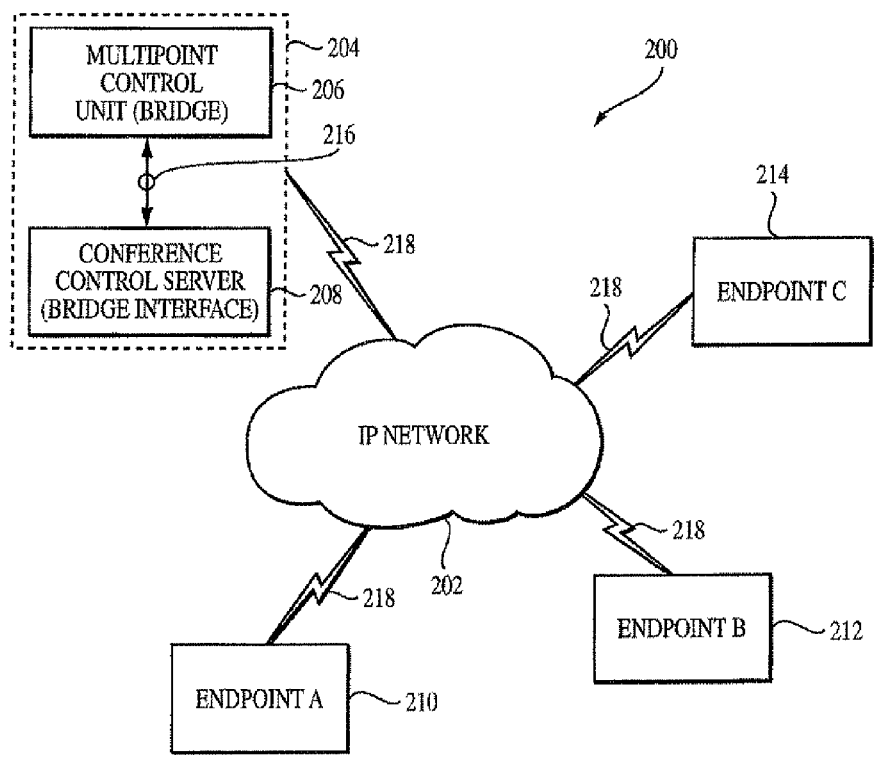
FIG. 2 is an exemplary system diagram that facilitates a dynamically allocated IP address for at least one endpoint in an audiovisual conference according to the present invention.

FIG. 2 is an exemplary system diagram 200, which facilitates a dynamically allocated IP address for at least one endpoint in an audiovisual conference. The IP network 202 may represent an Intranet or the Internet. Endpoints A 210, B 212 and C 214 may be located anywhere on the IP network and will be connected to the IP network 202 at the time of the scheduled audiovisual conference via links 218. FIG. 2 further depicts a logical construct 204 (i.e., an enhanced bridge) comprising a multipoint control unit (i.e., "MCU") or bridge 206 and a conference control server (i.e., "CCS") or bridge interface 208. The MCU 206 is coupled to the CCS via link 216. It is noted that the components of the enhanced bridge 204 may be standalone components, which are connected via separate links 218 to the IP network 202 and may further connect to the IP network 202 at different locations.

Figure 3:
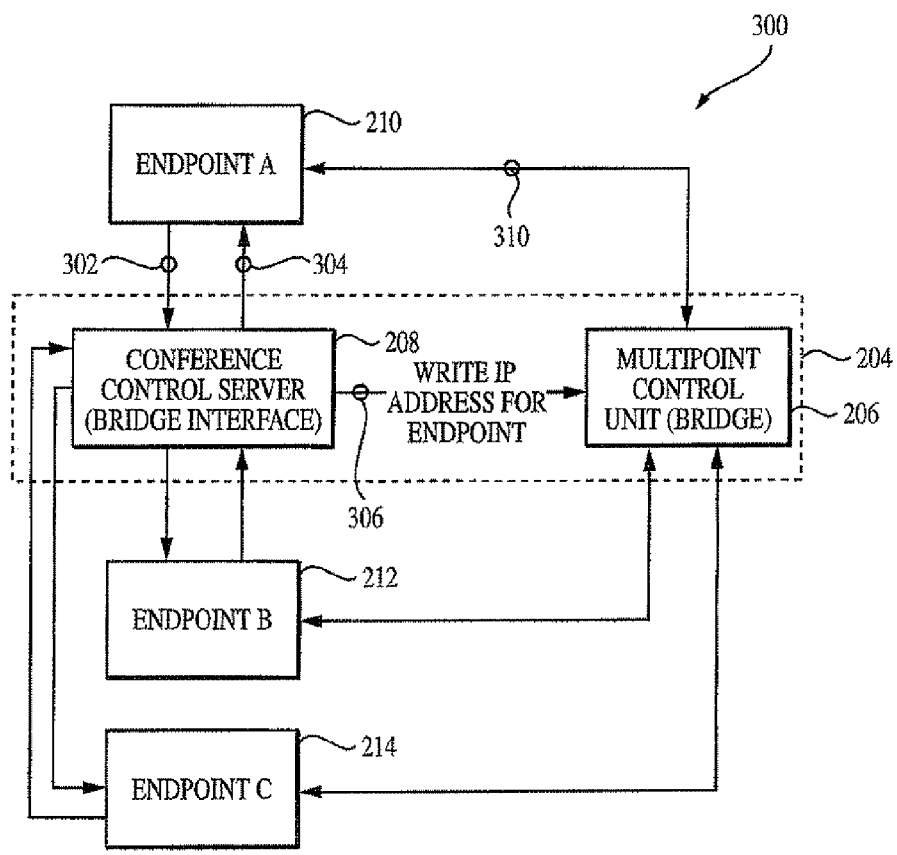
FIG. 3 is an exemplary block diagram of components in FIG. 2 and a flow of data between the components for facilitating a dynamically allocated IP address for at least one endpoint in an audiovisual conference according to the present invention.

FIG. 3 is an exemplary block diagram 300 of components in FIG. 2 and the flow of data between the components for facilitating a dynamically allocated IP address for at least one endpoint in an audiovisual conference according to the present invention. It is noted that MCU 206 has stored thereon the preexisting IP addresses for each endpoint scheduled to participate in the audiovisual conference. Endpoint A 210 logs onto the IP network 202 according to FIG. 2 and contacts the conference control server (CCS) or bridge interface 208 at 302 to request to join the audiovisual conference. Via 304, the CCS 208 obtains from endpoint A 210, a current IP address at which endpoint A is currently logged onto IP network 202. The CCS 208 writes the current IP address for endpoint A 210 to MCU 206 via 306, thereby overwriting the preexisting IP address stored at the MCU 206 for endpoint A 210. The MCU 206 thereafter utilizes the current address via 310, which is now stored at the MCU 206 for endpoint A 210, to send and receive audiovisual conference data (i.e., audio, video, data, and combination thereof) between endpoints of the audiovisual conference. It is noted that the other endpoints B 212 and C 214 may follow the same procedure as outlined above with respect to endpoint A 210.

Figure 4:
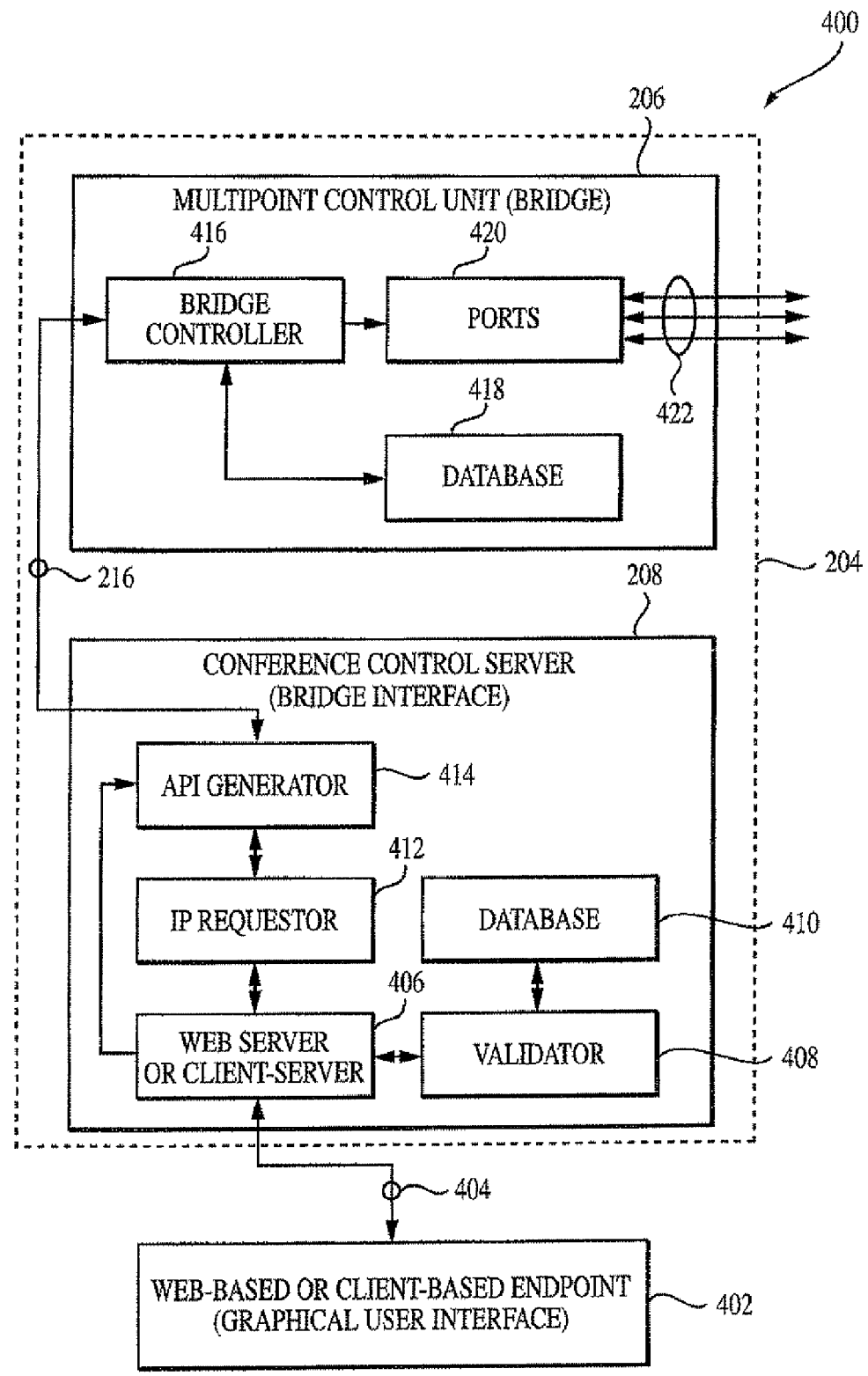
FIG. 4 is an exemplary detailed block diagram of the components in FIGS. 2 and 3 for facilitating a dynamically allocated Internet Protocol (i.e., "IP") address, a dynamically provided Integrated Service Digital Network (i.e., "ISDN") telephone number (or portion thereof) and a Public Switched Telephone Network (i.e., PSTN) telephone number (or portion thereof) for at least one of the endpoints in an audiovisual conference according to the present invention.

FIG. 4 is an exemplary detailed block diagram 400 of the MCU 206, the CCS 208 and an endpoint 402 for facilitating a dynamically allocated IP address, a dynamically provided Integrated Service Digital Network (i.e., "ISDN") telephone number (or portion thereof) and a Public Switched Telephone Network (i.e., PSTN) telephone number (or portion thereof) for at least one endpoint in an audiovisual conference according to the present invention. FIG. 4 will first be described with reference to scheduling an audiovisual conference between the exemplary endpoints A 210, B 212 and C 214, and FIG. 4 will further be described with reference to joining a scheduled audiovisual conference that has been setup for the endpoints. Thus the setup begins with an endpoint 402, which can be any of the foregoing endpoints 210-214 or yet another endpoint that will not be a participant in the audiovisual conference, contacting the CCS or bridge interface 208 via link 404 to schedule a video conference with a plurality of participants. The endpoint 402 is preferably a web-based graphical user interface (i.e., "GUI"), and alternatively, a client-based GUI.

Further with reference to FIG. 4, the CCS or bridge interface 208 comprises a web-server or a client-server 406, a validator 408, a database 410, an IP requester 412 and an application program interface (i.e., "API") generator 414. Preferably, the CCS or bridge interface 208 comprises a web-server 406, and alternatively, a client-server 406. The following description generally describes a web-based scheduling implementation, with interlineated description of the client-based implementation differences. After the endpoint 402 contacts the CCS 208, the CCS 208 transmits one or more web pages associated with scheduling a conference (not shown) to the endpoint 402. The one or more web pages afford an opportunity to the endpoint 402 to provide information associated the audiovisual conference and to transmit the information to the web server 406 of the CCS 208. The transmission of the information to the web server 406 may easily be accomplished via a server-side Common Gateway interface (i.e., CGI) program, or the client-side program, such as, Java™ applet, Java™ scripts or ActiveX™ control, and other like technologies. In the client-based implementation, the endpoint 402 executes a client-based application and the client-server executes a server application, which facilitate information entry and information transmission between the client-based endpoint 504 and the client-server 406. The information provided is the time and date for the audiovisual conference and the participants that are to attend the audiovisual conference. As part of the audiovisual conference participants' information, the endpoint 402 provides a username, password and an email account for each participant, and an IP address (web-based or client-based endpoint), or a telephone number or a portion of the telephone number (ISDN-based, PSTN-based endpoint), such as area code or telephone prefix, for the participant. This portion of the telephone may be stored in the database 410 for subsequent combination with another portion of the telephone number provided by the participant that joins a scheduled conference, thereby completing the actual telephone number to be used for the audiovisual conference. Alternatively, the CCS may assign a randomly generated username and password for the participant. The IP address or ISDN/PSTN telephone number (or portion thereof) may be the actual IP address or telephone number (or portion thereof) of the participant, if known, be a fictitious IP address or telephone number, or a unique identifier assigned by the CCS 208. After receiving the information associated with the audiovisual conference from the endpoint 402, the web server 406 (or client-server 406) transmits the provided information to the validator 408, which validates the provided information. The validation comprises validating available resources of the MCU or bridge 206, such as available ports, time and date for an audiovisual conference. This information is replicated and stored to database 410 in the CSS 208 from the database 418 in the MCU 206. Upon successful validation of resources, the validator 408 transmits the information to the database 410, which generates a record of the audiovisual conference (not shown) and stores the associated information for the audiovisual conference. Additionally, after validation, the validator 408 notifies the web server 406 (or client-server 406) that the information provided was successfully validated. Based on this notification, the web server 406 calls an API generator 414 directly with the information associated with the audiovisual conference, i.e., the time and date, and each participant's information. The API generator generates APIs, which provide an interface to the MCU or bridge 206, using the information transmitted from the web server 406 (or client-server 406). The CCS or bridge interface 208 transmits the generated APIs to the MCU or bridge 206 via link 216. Concurrently with transmitting the information to the MCU 206, the CCS 208 emails each of participants in the audiovisual conference at the email addresses provided, notifying each participant of audiovisual conference's date, time and location (i.e., IP address), as well as specifying the participant's username and password for joining the audiovisual conference at the appointed date and time and at the specified location. The information associated with the audiovisual conference may be easily distributed to the participants via other conventional methods.

Still further with reference to FIG. 4, the MCU or bridge 206 receives the transmitted APIs at a bridge controller 416. The bridge controller 416 executes the APIs, which schedules the audiovisual conference by generating a record in a database 418, similarly to the database 410 in the CCS or bridge interface 208, and reserving two or more ports 422 from the plurality of available ports 420 for the participants in the audiovisual conference. The controller 416 reserves a port by reserving an available port in the database 418, associating the reserved port with a participant (i.e., username) in the database 418, and writing the IP address or the telephone number (or portion thereof) that is associated with the participant into the reserved port. For example, three ports 422 are reserved for the exemplary endpoints A 210, B 212 and C 214 in FIGS. 2 and 3. It is noted that the number of ports to be reserved depends on a number of participants in the audiovisual conference and the total number of available ports in the MCU or bridge 206.

Yet further with reference to FIG. 4, joining an already scheduled audiovisual conference will be described according to the present invention. At this point, it is assumed that each participant in the audiovisual conference has received information associated with the audiovisual conference, such as location (IP address for audiovisual conference), date and time, username and password, via an email or other conventional method. It is further assumed that a participant scheduled for the audiovisual conference is located at any particular endpoint 402. The participant at the endpoint 402 logs onto an IP network 202 as described with reference to FIG. 2, and contacts the web server or the client-server 406 of the CCS 208 at the specified IP address. At this point, in the web-based implementation the web server 406 transmits a logon web page to the endpoint 402 for the participant to join the audiovisual conference. In the client-based implementation, a client program displays a logon screen to the participant. Amongst logon-specific information, i.e., username and password, the logon web page comprises a script, written in any conventional web-based programming language (i.e., Java applet, Java script, and the like), which obtains the IP address of the endpoint 402. Thereafter, the participant provides the assigned username and password to the web server 406 (or client-server 406) by filling out the logon web page (screen display) and hitting submit or logon button. At this point, the IP address of the endpoint 402 is passed along to the web server 406 with the logon information. In the client-based implementation, the client-server 406 knows the IP address of the endpoint at the time of long onto the IP network; therefore, the script in the web-based implementation is not necessary. The web server 406 (client-server 406) transmits the username and password to the validator 408, which further validates whether the participant is indeed scheduled to participate in the audiovisual conference by validating the participant's username and password against the participant information that was stored for the audiovisual conference in the database 410 during scheduling. After successful validation, the web server 406 notifies the IP requester 412 that a participant has successfully logged into the scheduled audiovisual conference. The IP requestor 412 requests from the web server 406 (or client-server 406) the IP address at which the endpoint 402 is logged on to the IP network 202. The web server transmits the IP address to the IP requester 412. However, if the validator 408, after contacting the database 410 with the username and password, determines that the participant valid and is scheduled to join the audiovisual conference via ISDN/PSTN not IP, the validator 408 notifies the web-server 406 (or client-server 406) to query the participant whether the telephone number (or portion thereof) stored for the participant in the database 410 is correct, and if necessary, to change the telephone number or to provide a portion of the telephone number in addition to the portion stored at the CCS 208 to form an appropriate full telephone number. If a portion of the telephone number if provided by the participant, the CCS 208 combines the stored portion (e.g., area code, prefix) and the provided portion to form a fully completed telephone number. Thereafter, the participant's corrected telephone or completed telephone number is written to the database 410 and the web server 406 (or client-server 406). The web-server 406 in sequence requests the API generator 414 to generate one or more APIs comprising the username, password and IP address (or telephone number) for the participant. The API generator 414 generates the API and transmits the APIs via link 216 to the MCU 206 bridge controller 416. The bridge controller 416 executes the APIs, looking up a port associated with the username in the database 418, storing the current IP address (or telephone number) associated with the participant into the database 418, and overwriting the IP address (or telephone number) in the port reserved for the participant 422 with the current IP address or telephone number. At this point, the MCU or bridge 206 initiates the multipoint audiovisual conference communication with the participant at endpoint 402 via the registered port using the current IP address in the registered port or dials the telephone number for the endpoint in the registered port. Thus, what has been described is a system and method for facilitating a dynamically allocated IP address, a dynamically provided ISDN/PSTN telephone number for at least one endpoint in an audiovisual conference.

While the invention has been particularly shown and described with respect to a preferred embodiment thereof, it will be understood by those skilled in the art that the foregoing and other changes in form and details may be made therein without departing from the spirit and scope of the invention.

The invention claimed is:

1. A method for establishing a connection for an endpoint to a scheduled audiovisual conference between a plurality of participants, the plurality of participants connecting to the audiovisual conference from a plurality of endpoints, connections for the plurality of endpoints to the audiovisual conference being maintained by a multipoint control unit, the method comprising:
   (a) receiving a request at a conference control sewer from a participant to connect an endpoint associated with the participant to the scheduled audiovisual conference;
   (b) obtaining an IP address or a telephone number for the endpoint;
   (c) writing the IP address or the telephone number for the endpoint to the multipoint control unit; and
   (d) communicating audiovisual conference data from the multipoint control unit to the endpoint via the IP address or the telephone number, thereby enabling the endpoint to be connected to the audiovisual conference.

2. The method for establishing a connection for an endpoint to a scheduled audiovisual conference according to claim 1, wherein the writing step (c) includes overwriting a previous IP address or telephone number for the endpoint stored at the multipoint control unit.

3. The method for establishing a connection for an endpoint to a scheduled audiovisual conference according to claim 1, wherein the method further comprises a step of validating the participant at the conference control server to determine whether the participant is scheduled to attend the audiovisual conference.

4. The method for establishing a connection for an endpoint to a scheduled audiovisual conference according to claim 3, wherein the participant is validated by comparing a username and a password stored at the conference control server for the participant with username and password provided by the participant.

5. The method for establishing a connection for an endpoint to a scheduled audiovisual conference according to claim 1, wherein the method further comprises a step of determining whether the endpoint is to connect to the audiovisual conference via Internet Protocol (IP), Integrated Service Digital Network (ISDN) or Public Switched Telephone Network (PSTN).

6. The method for establishing a connection for an endpoint to a scheduled audiovisual conference according to claim 5, wherein if the endpoint is to connect to the audiovisual conference using ISDN or PSTN, the step (b) of obtaining the telephone number comprises querying the participant for a current telephone, or a portion of the current telephone number to be combined with a pre-stored portion of the current telephone number forming the current telephone number for the endpoint.

7. The method for establishing a connection for an endpoint to a scheduled audiovisual conference according to claim 1, wherein the step (b) of obtaining IP address for the endpoint includes executing the steps of:
   executing a query at the endpoint to determine the IP address of the endpoint; and
   transmitting the determined IP address to the conference control server.

8. The method for establishing a connection for an endpoint to a scheduled audiovisual conference according to claim 1, wherein the writing step (c) comprises the steps of:
   generating one or more application program interfaces (APIs) at the conference control server comprising the IP address or the telephone number for the endpoint;
   transmitting the one or more APIs to the multipoint control unit; and
   executing the one or more transmitted APIs at the multipoint control unit, thereby writing the address or the telephone number to the multipoint control unit.

9. A system for establishing a connection for an endpoint to a scheduled audiovisual conference between a plurality of participants, the plurality of participants connecting to the audiovisual conference from a plurality of endpoints, connections for the plurality of endpoints to the audiovisual conference being maintained by a multipoint control unit, the system comprising:
   a conference control server coupled the multipoint control unit for:
   (a) receiving a request from a participant to connect an endpoint associated with the participant to the scheduled audiovisual conference;
   (b) obtaining an IP address or a telephone number for the endpoint; and
   (c) writing the IP address or the telephone number for the endpoint to the multipoint control unit, wherein the multipoint control unit communicates audiovisual conference data from the multipoint control unit to the endpoint via the IP address or the telephone number, thereby enabling the endpoint to be connected to the audiovisual conference.

10. The system for establishing a connection for an endpoint to a scheduled audiovisual conference according to claim 9, wherein the system comprises a validator for validating the participant at the conference control server to determine whether the participant is scheduled to attend the audiovisual conference.

11. The system for establishing a connection for an endpoint to a scheduled audiovisual conference according to claim 10, wherein the participant is validated by comparing a username and a password for the participant stored at a database associated with the conference control server with username and password provided by the participant.

12. The system for establishing a connection for an endpoint to a scheduled audiovisual conference according to claim 9, wherein the conference control server further determines whether the endpoint is to connect to the audiovisual conference via Internet Protocol (IP), Integrated Service Digital Network (ISDN) or Public Switched Telephone Network (PSTN).

13. The system for establishing a connection for an endpoint to a scheduled audiovisual conference according to claim 12, wherein if the endpoint is to connect to the audiovisual conference using ISDN or PSTN, the conference control server obtains the telephone number by querying the participant for a current telephone number or for a portion of the current telephone number to be combined with a pre-stored portion of the current telephone number at the conference control server forming the current telephone number for the endpoint.

14. The system for establishing a connection for an endpoint to a scheduled audiovisual conference according to claim 9, wherein conference control server comprises a web server to generate a script for querying the endpoint to determine the IP address of the endpoint, wherein the determined IP address is transmitted to the conference control server from the endpoint.

15. The system for establishing a connection for an endpoint to a scheduled audiovisual conference according to claim 9, wherein the conference control server further comprises:
   a generator for generating one or more application program interfaces (APIs) comprising the IP address or the telephone number for the endpoint; and
   a transmission means for transmitting the one or more APIs to the multipoint control unit,
   wherein the multipoint control unit executes the one or more transmitted APIs, thereby writing the IF address or the telephone number to the multipoint control unit.

* * * * *